March 20, 1928.  H. L. BRANDAU  1,663,535
AUTOMATIC CORE CUTTER AND LAYING-UP MACHINE
Filed Aug. 29, 1927   4 Sheets-Sheet 1
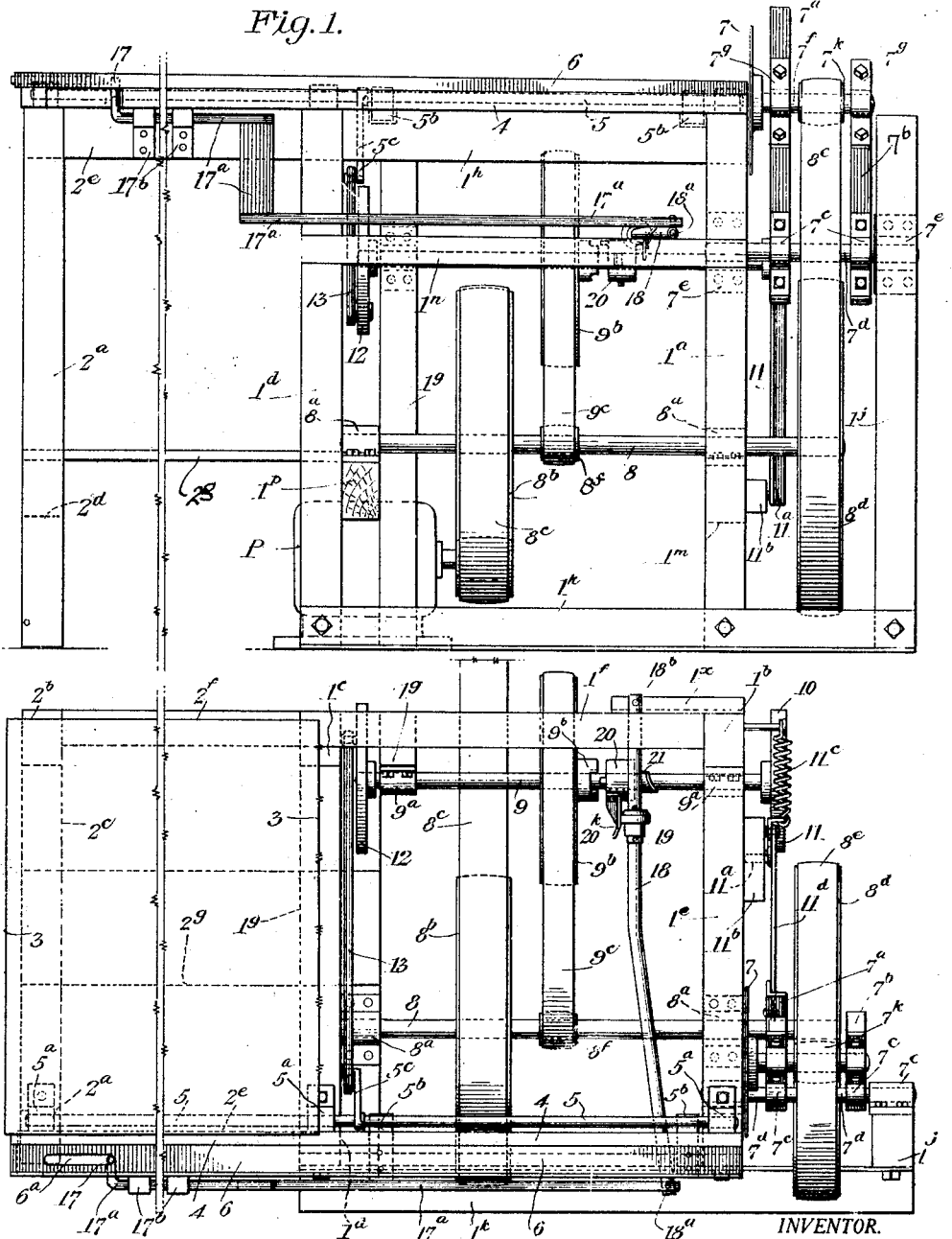
INVENTOR.
BY Harold L. Brandau
ATTORNEYS March 20, 1928.

H. L. BRANDAU 1,663,535

AUTOMATIC CORE CUTTER AND LAYING-UP MACHINE

Filed Aug. 29, 1927

INVENTOR.

BY Harold L. Brandau

ATTORNEYS

March 20, 1928.
H. L. BRANDAU
1,663,535
AUTOMATIC CORE CUTTER AND LAYING-UP MACHINE
Filed Aug. 29, 1927　　4 Sheets-Sheet 3
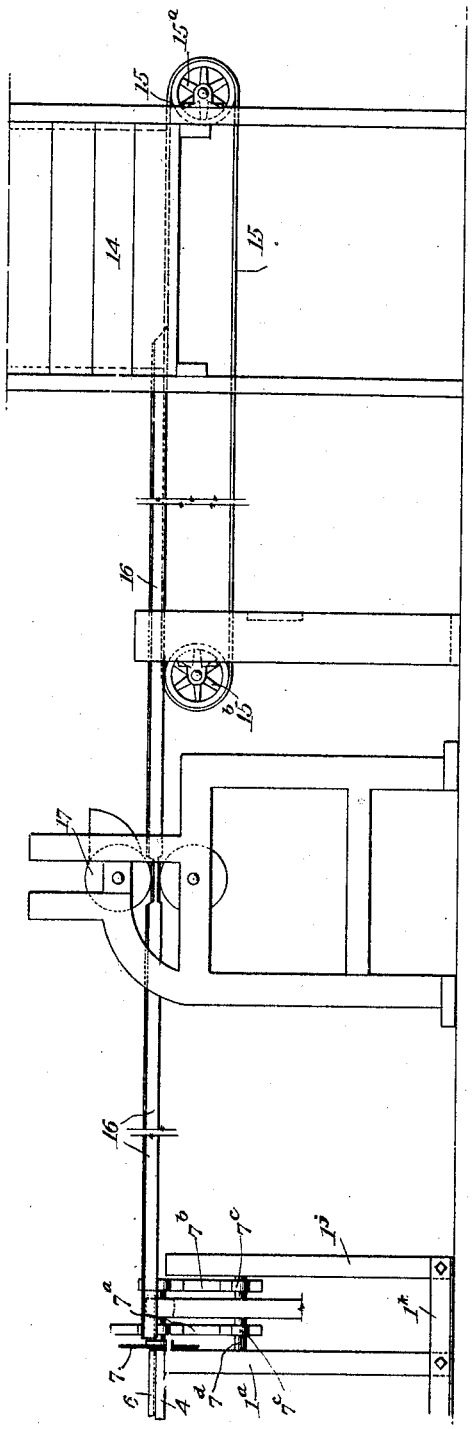
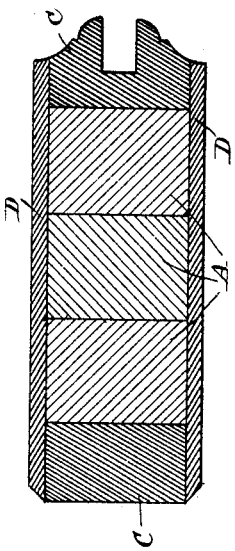
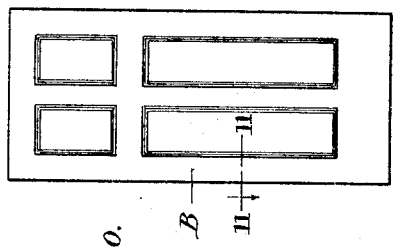
INVENTOR.
BY Harold L. Brandau
Alexander Powell
ATTORNEYS March 20, 1928.
H. L. BRANDAU
1,663,535
AUTOMATIC CORE CUTTER AND LAYING-UP MACHINE
Filed Aug. 29, 1927  4 Sheets-Sheet 4
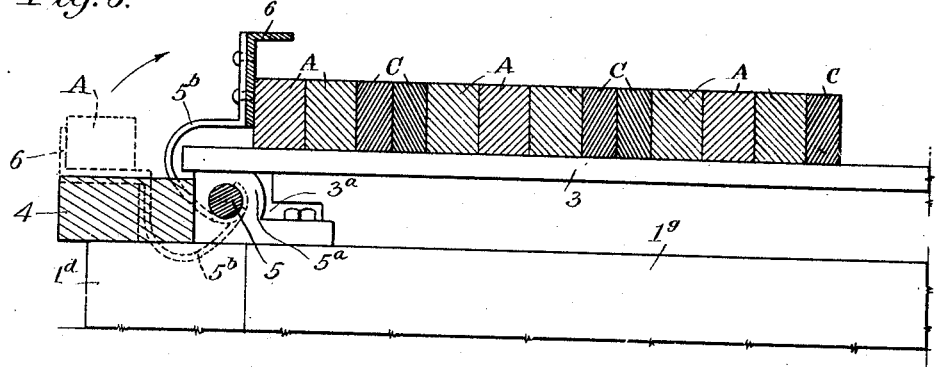
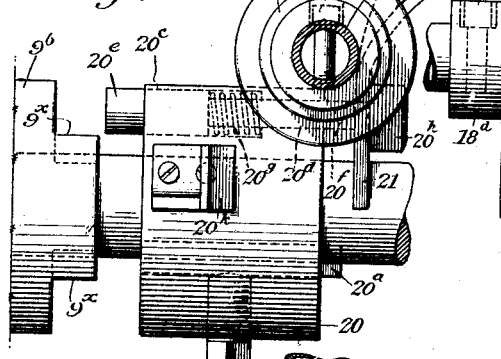
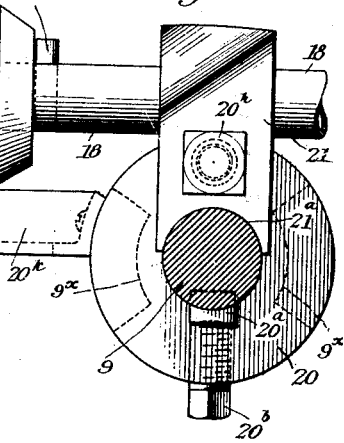
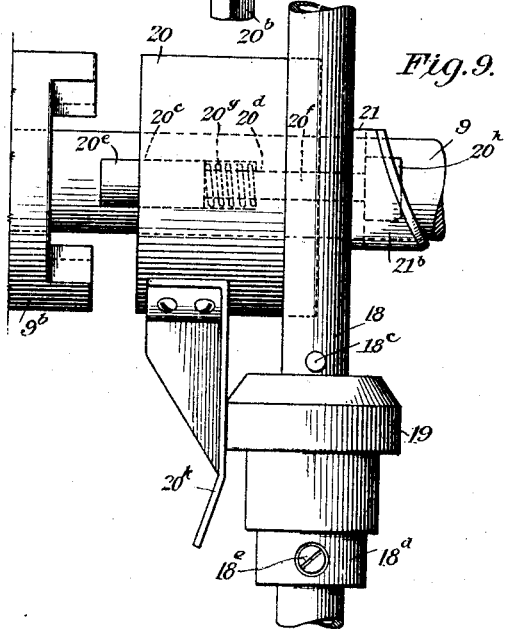
INVENTOR.
Harold L. Brandau
BY
Alexander Powell
ATTORNEYS Patented Mar. 20, 1928.

1,663,535

UNITED STATES PATENT OFFICE.

HAROLD L. BRANDAU, OF MUSCATINE, IOWA, ASSIGNOR TO HUTTIG MANUFACTURING CO., OF MUSCATINE, IOWA, A CORPORATION OF IOWA.

AUTOMATIC CORE CUTTER AND LAYING-UP MACHINE.

Application filed August 29, 1927. Serial No. 216,089.

This invention is a novel automatic core cutter and lay-up machine particularly adapted for use in making and gluing the cores for the stiles, rails and other relatively thick parts for veneered doors and the like, which cores are later planed to size and the veneer applied.

In veneered doors the stiles, top rails, middle rails, muntins, and bottom rails are all made upon a core, consisting of rows of pine or other inexpensive blocks of various short lengths, glued together, the number of rows of blocks varying according to the width of the desired rail or stile and the length of each row conforming with the length of the desired rail or stile. In order to give a finished appearance on the outer edges of the rail or stile an edge strip is used of the same kind of wood as the veneered face of the door which strip forms a part of the core.

My novel machine is designed to increase production and produce cores for such rails, stiles, and the like more economically, the short length pine blocks being fed in axial alignment under a glue roller on a regular stock glue spreader and into the end of a tiltable trough located on the front of the machine. The blocks travel into the trough, until reaching the extreme end of the trough, when they strike against a trip which automatically swings the entire row of glued blocks and transfers the row onto a core board located upon the top of the machine. An automatic cross-cut saw at the inlet end of the trough is so timed as to cut off any portion of the row of blocks that may overhang the inner end of trough just before the trough is tilted.

This operation is continued until enough rows of blocks have been spread with glue and transferred to the core board on the top of the machine to make a rail of the desired width. The entire rail is then conveyed to an air clamp where the core sections under air pressure are properly bound together with retaining clamps, after which the core sections are removed from the air clamp and the glue is permitted to properly set.

Other minor objects of the invention will be hereinafter set forth.

I will explain the invention with reference to the accompanying drawings which illustrate one practical embodiment thereof to enable others familiar with the art to adopt and use the same; and I will summarize in the claims the novel features of construction, and novel combinations of parts, for which protection is desired.

In said drawings:

Figure 1 is a side elevation of the machine, partly broken away;

Fig. 2 is a top plan view thereof;

Fig. 5 is a side view of the device for applying glue to the upper faces of the core blocks as same are fed into the trough;

Fig. 6 is an enlarged section through the core board showing a plurality of door stile cores thereon; and showing in full lines the core trough in raised position; and the same in normal lowered position in dotted lines;

Figs. 7, 8, and 9 are enlarged detail views of the cam shaft clutch operating means;

Fig. 10 is a small view of a veneered door;

Fig. 11 is an enlarged section on the line 11—11, Fig. 10.

Figure 3:
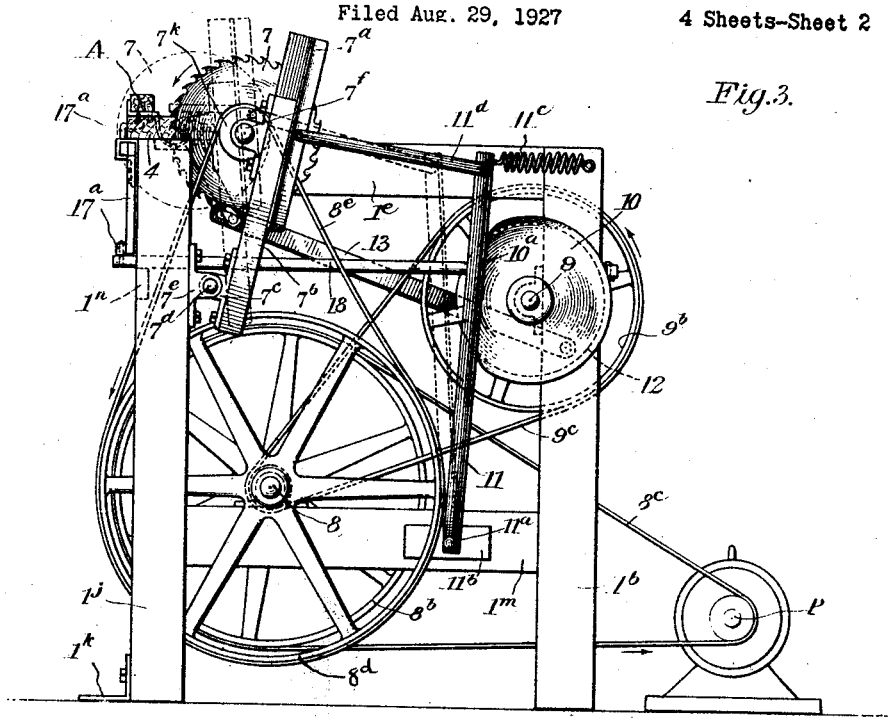
Fig. 3 is an end view thereof.

As shown in Figs. 1–3 inclusive the machine preferably comprises a rectangular frame consisting of four corner uprights $1^a$, $1^b$, $1^c$, and $1^d$ connected at their upper ends by means of beams $1^e$, $1^f$, $1^g$, and $1^h$. Beside and spaced from upright $1^a$ and exterior to the frame is a post $1^i$ which is rigidly connected at its lower end with the lower ends of uprights $1^a$ $1^d$ by an angle iron $1^k$. Extending between uprights $1^a$ and $1^b$ adjacent their lower ends is a beam $1^m$; and connecting uprights $1^a$ and $1^d$ adjacent their upper ends is a beam $1^n$; and connecting uprights $1^c$ and $1^d$ is a beam $1^p$ disposed at the same height as beam $1^m$. Between the uprights $1^b$ $1^c$, but adjacent the upright $1^c$ is a post $1^s$ extending from the floor to the side beam $1^f$ to which it is rigidly attached. The frame may be further strengthened with other braces and beams, if desired, said frame carrying the power devices as hereinafter set forth.

Extending from the opposite end of the frame from post $1^j$ is a table portion of desired length disposed at the same height as beam $1^g$, said table comprising outer corner uprights $2^a$ $2^b$ connected at their upper ends by beam $2^c$ and at their lower ends by beam $2^d$. The upper ends of uprights $2^a$ $2^b$ are respectively connected to the main frame uprights $1^d$ $1^c$ by side beams $2^e$ $2^f$. A brace board $2^g$ extends between the beams $1^p$ and $2^d$.

Upon the top of the table and frame is a removable core board 3 (Figs. 2 and 6) mounted upon rests $3^a$ (Fig. 6) said core board being adapted to receive the rows of glued core blocks A which make up the core (Fig. 11) of the door stile.

Mounted upon the top of the frame and table at one side thereof is a trough rest 4, extending between the uprights $1^a$ and $2^a$, said rest 4 being adapted to support the trough 6, hereinafter described, when same is in normal lowered position as shown in Fig. 3 and in dotted lines in Fig. 6.

Extending beside and parallel with trough rest 4 is a rocker shaft 5 journalled in suitable bearings $5^a$ upon the top of the table and frame. Shaft 5 carries a plurality of curved arms $5^b$ (Fig. 6) supporting at their outer ends a core block trough 6, preferably consisting of an angle-iron which when in normal lowered position lies upon the trough rest 4 as shown in dotted lines in Fig. 6, but when the shaft 5 is rocked as hereinafter described trough 6 is raised into vertical position, as shown in full lines in Fig. 6, the inner edge of trough 6 overlying the core board 3 to deposit the row of core blocks A upon said core board, such action being permitted by the curvature of arms $5^b$.

Between upright $1^a$ and post $1^j$ is a rocking frame consisting of parallel members $7^a$, $7^b$, journalled in bearings $7^c$ upon a common shaft $7^d$ which shaft is journalled in bearings $7^e$ attached to the sides of upright $1^a$ and post $1^j$. The shaft $7^f$ of saw 7 is journalled in bearings $7^g$ adjacent the outer ends of members $7^a$, $7^b$ and is disposed at substantially the same height and adjacent the inner end of trough 6 but normally out of alignment therewith as shown in full lines in Fig. 3 so that the core blocks A may be normally fed into the trough, but when the saw frame is rocked as shown in dotted lines in Fig. 3 saw 7 will cut off the overhanging ends of the block A just prior to the transfer of the row of blocks A to the core board 3.

Journalled in bearings $8^a$ upon the beams $1^m$ $1^p$ and below and parallel with trough 6 is a power shaft 8 having a large pulley $8^b$ fixed thereon which is continuously driven by a belt $8^c$ from a suitable prime mover P. Shaft 8 extends beyond the end of the frame and has fixed on its outer end a second large pulley $8^d$ below a small pulley $7^k$ on the saw shaft $7^f$, and a belt $8^e$ runs around pulleys $8^d$ and $7^k$ to constantly rotate the saw shaft at high speed.

At the other side of the frame is a cam shaft 9 journalled in bearings $9^a$ on the side of upright $1^b$ and post $1^g$ at about the height of beam $1^n$, said shaft extending beyond the upright and post. Loosely mounted upon the shaft 9 is a large pulley $9^b$ constantly driven by a belt $9^c$ running over said pulley and a small pulley $8^f$ fixed upon the power shaft 8. Shaft 9, upon each rotation as hereinafter explained when actuated by a trip device rocks the frame of saw 7 and trough shaft 5. Upon the outer end of shaft 9 is a disk cam 10 having a flat portion $10^a$ against which normally rests an arm 11 pivoted at $11^a$ on a block $11^b$ fixed upon the side of beam $1^m$. A spring $11^c$ connecting the upper end of arm 11 with the upright $1^b$ normally urges arm 11 into contact with the said cam. A link $11^d$ connects the upper end of arm 11 with the member $7^a$ of the saw frame, said link being of such length that when arm 11 engages the flat portion $10^a$ of cam 10 the saw frame will be so swung that saw 7 is moved out of the path of trough 6, as shown in full lines in Fig. 3, but when arm 11 engages the curved portion of cam 10 the saw frame will be moved to project saw 7 into the path of trough 6 to saw off the end of the block A therein, as shown in dotted lines in Figs. 3 and 4.

At the other end of shaft 9 is a disk crank 12 having eccentrically pivoted thereon one end of a link 13, said link having a slot $13^a$ in its outer end adapted to receive a pin on the outer end of a rocker arm $5^c$ fixed to rocker shaft 5.

Figure 4:
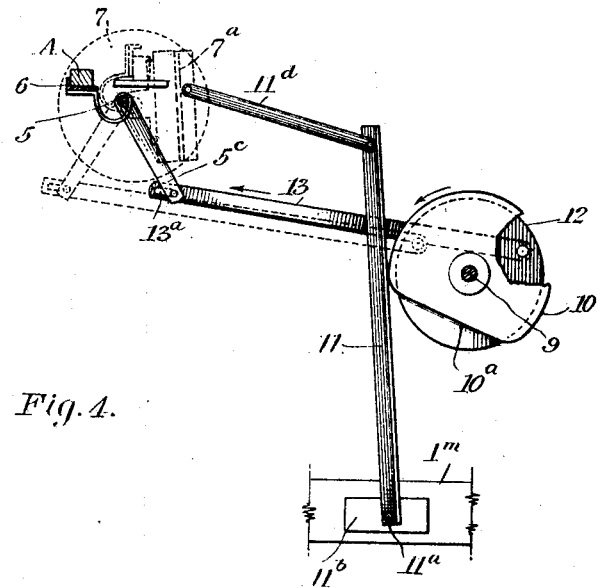
Fig. 4 is a view showing the relation of the saw operating cam and the trough raising mechanism.

The relation between the movements of saw 7 and shaft 5 is as follows: In the position shown in full lines in Fig. 3, both saw 7 and shaft 5 are in normal positions, i. e., the saw frame is retracted and trough 6 is resting upon trough rest 4. As shaft 9 rotates counter-clockwise, as shown by the arrows in Figs. 3 and 4, arm 11 rides up upon the curved portion of cam 10 as shown in Fig. 4 and link $11^d$ projects the saw frame so as to move saw 7 into the path of trough 6 to cut off the end of block A. In the meantime crank disk 12 had rotated through the same arc as cam 10 and the inner end of link 13 has been merely raised upwardly on the same side of shaft 9 and due to the slot $13^a$ therein a dwell is provided whereby arm $5^c$ remains unmoved until the saw 7 has been moved to cut off block A, as shown in Fig. 4. Saw 7 remains in projected position during the remaining portion of the rotation of shaft 9, while arm $5^c$ is moved by link 13 to raise trough 6 to dump the row of blocks A upon the core board 3 as shown in dotted lines in Fig. 4, the end core block A during such tilting of trough 6 bears against the side of saw 7 which acts as a guide for the row of blocks during such dumping. At the end of each rotation of shaft 9 the arms 11 and 13 have reassumed their normal positions shown in full lines in Fig. 3.

The short length core blocks A of square or rectangular cross section are fed into trough 6 from a hopper 14, Fig. 5, upon an endless belt 15 running over pulleys $15^a$, $15^b$ which are driven by any suitable means (not shown) and conveyed by belt 15 into the end of a channel 16 from whence the blocks are pushed in axial alignment under a glue spreading roller 17 of a regular stock glue spreader. The blocks A, thus coated on their upper faces with glue, pass out of trough 16 and into the trough 6 which is in axial alignment therewith, enough space being left between the adjacent ends of the troughs to permit operation of saw 7 as above explained. The aligned blocks pass along the trough 6 until the foremost block A contacts with a trip finger 17 on a trip rod $17^a$ slidably mounted in bearings $17^b$ on the side of the frame and table below the trough 6, trip finger 17 extending upwardly through a slot $6^a$ in the bottom of the trough 6 and trough rest 4 (Fig. 2). Movement of trip 17 and rod $17^a$ brings into operation the clutch mechanism, hereinafter explained, which causes cam shaft 9 to make one revolution to operate saw 7 cutting off the overhanging portion of the rearmost block A in trough 6, and later rocking shaft 5 to swing trough 6 upwardly and deposit the row of aligned blocks A on the core board 3 beside and touching the next preceding row of blocks thereon with the glue coated face of each row of blocks contacting with a face of the preceding row, as shown in Fig. 6.

The clutch mechanism is as follows: Above and at right angles to cam shaft 9 and adjacent pulley $9^b$ is a pipe 18 having one end slidably resting upon the beam $1^n$ and pivotally connected at $18^a$ to trip rod $17^a$. The other end of pipe 18 is pivotally connected as at $18^b$ to a fixed member $1^x$ on the side of the frame, whereby as trip rod $17^a$ is shifted the pipe 18 will be swung horizontally towards or away from the pulley $9^b$. On pipe 18 between the shaft 9 and rod $17^a$ is a contact collar 19 held between a pin $18^c$ and a collar $18^d$ fixed to pipe 18 by a screw or bolt $18^e$ to prevent axial movement of collar 19 on pipe 18. Fixedly mounted on shaft 9 below pipe 18 and adjacent the hub of pulley $9^b$ is a collar 20 which is prevented from axial movement on shaft 9 by a key $20^a$ and set screw $20^b$. Extending longitudinally through collar 20 is a stepped bore $20^c$, $20^d$, parallel with and above the shaft 9, into which bore is fitted a bolt having a portion $20^e$ slidably fitting the larger step $20^c$ and having a reduced shank portion $20^f$ slidably fitting the smaller step $20^d$ of the bore. A spring $20^g$ around the shank $20^f$ and interposed between the larger portion $20^e$ of the bolt and the inner end of bore $20^c$ normally tends to urge the bolt outwardly into contact with a clutch face $9^x$ on the adjacent end of pulley $9^b$.

The shank portion $20^f$ of the bolt extends beyond the opposite end of the collar 20 and on said shank adjacent the head $20^h$ of the bolt is a vertically disposed plate 21 having a semicircular groove $21^a$ in its lower edge adapted to seat upon and slidably engage the shaft 9. The upper end of plate 21 is adapted to contact with pipe 18 to govern the sliding movement of the bolt $20^e$.

When trip finger 17 is at the inner end of slot $6^a$ (Fig. 2) the parts should be so adjusted that pipe 18 will maintain the plate 21 in such position that bolt $20^e$ will not engage the clutch face of $9^x$ of the constantly rotating pulley $9^b$, and hence shaft 9 will not be rotated. When however the trip 17 is moved to the right (Fig. 2) pipe 18 will be also shifted to the right, and plate 21 following pipe 18 by the action of spring $20^g$ will cause bolt $20^e$ to be shifted to engage the clutch face $9^x$ thereby causing shaft 9 to rotate with pulley $9^b$.

On collar 20 is a radial arm $20^k$ disposed between the pipe 18 and pulley $9^b$ which arm when rotating will not strike collar 19 if the pipe 18 is in normal position. Arm $20^k$ (Fig. 8) is disposed below the collar 19 so that when pipe 18 is shifted towards pulley $9^b$ and collar 20 starts to rotate in an anticlockwise direction, arm $20^k$ will not strike collar 19 until just at the end of one complete revolution of shaft 9 at which time the blocks A have been transferred to the core board 3 and trip finger 17 is free to return to normal position.

The striking of collar 19 by arm $20^k$ at the end of the one rotation of shaft 9 restores pipe 18 and trip 17 to normal position, and shaft 9 ceases to rotate.

The upper end of plate 21 is bent as at $21^b$ so that same when rotating will not strike the collar 19 as such action would declutch bolt $20^e$ before one complete rotation of shaft 9.

In making veneered doors (Fig. 10) all parts except the panels themselves are made up on these soft pine cores. Fig. 11 shows a section through a completed door stile in which three rows of soft pine core blocks A are used. In order to give a finished appearance to the outer edges, I preferably use edge strips C which extend the full length of the stile and are of the same kind of wood as the veneer facing D. These strips C may be made on the machine, but are usually one-piece and extend the full length of the stile. In Fig. 6 two complete cores with edge strips are shown in the core board 3, the inner core being only partly made up on the core board and awaiting the transfer of the third row of core blocks A. Any number of sets of such cores may be made up on the board 3 according to the width of such board. When filled with freshly glued cores the entire core board is conveyed to a stock and clamp machine where the core sections under air pressure are properly clamped together with retaining clamps; and the cores are permitted to stand until the glue has properly set, then the core is dressed to size and veneered.

I do not limit my invention to the exact details shown in the drawings for obviously changes may be made therein within the scope of the claims.

I claim:—

1. In a core block laying-up machine; a core board; a trough movably mounted adjacent the core board; means for feeding aligned core blocks into the trough; and means for automatically moving the trough when filled to deposit the row of blocks upon the core board.

2. In combination with a machine as set forth in claim 1, means for automatically cutting off the overhanging portion of the blocks at the inlet end of the trough before the trough is moved.

3. In a machine as set forth in claim 1, said trough moving means comprising a trip extending into the trough in the path of the blocks; a rocker shaft carrying said trough, and means actuated by the trip for rocking the rocker shaft.

4. In combination with a machine as set forth in claim 1, a trip extending into the trough in the path of the blocks; a saw swingably mounted across the inlet end of the trough; and means actuated by the trip for swinging the saw to cut off the overhanging portion of the blocks in said trough.

5. In combination with a machine as set forth in claim 1, a trip extending into the trough in the path of said blocks; a rocker shaft carrying said trough; a saw swingably mounted across the inlet end of the trough; and means actuated by the trip for swinging the saw to cut off the overhanging portion of the blocks in said trough and for rocking the rocker shaft.

6. In a core block laying-up machine; a core board; a trough movably mounted adjacent the core board; means for automatically feeding aligned core blocks into the trough; and means for automatically moving the trough each time same is filled to deposit parallel rows of blocks upon the core board, the parallel rows contacting.

7. In combination with a machine as set forth in claim 6, means for automatically cutting off the overhanging portion of the blocks at the inlet end of the trough before the trough is moved.

8. In a machine as set forth in claim 6, said trough moving means comprising a trip extending into the trough in the path of the blocks; a rocker shaft carrying said trough, and means actuated by the trip for rocking the rocker shaft.

9. In combination with a machine as set forth in claim 6, a trip extending into the trough in the path of the blocks; a saw swingably mounted across the inlet end of the trough; and means actuated by the trip for swinging the saw to cut off the overhanging portion of the blocks in said trough.

10. In combination with a machine as set forth in claim 6, a trip extending into the trough in the path of said blocks; a rocker shaft carrying said trough; a saw swingably mounted across the inlet end of the trough; and means actuated by the trip for swinging the saw to cut off the overhanging portion of the blocks in said trough, and for rocking the rocker shaft.

11. In a core block laying-up machine; a core board; a trough movably mounted adjacent the core board; means for feeding aligned core blocks having their upper faces coated with adhesive into the trough; and means for automatically moving the trough each time same is filled to deposit parallel rows of blocks upon the core board, the adhesive coated face of each row contacting with a face of the preceding row.

12. In combination with a machine as set forth in claim 11, means for automatically cutting off the overhanging portion of the blocks at the inlet end of said trough before the trough is moved.

13. In a machine as set forth in claim 11, said trough moving means comprising a trip extending into the trough in the path of the blocks; a rocker shaft carrying said trough, and means actuated by the trip for rocking the rocker shaft.

14. In combination with a machine as set forth in claim 11, a trip extending into the trough in the path of the blocks; a saw swingably mounted across the inlet end of the trough; and means actuated by the trip for swinging the saw to cut off the overhanging portion of the blocks in said trough.

15. In combination with a machine as set forth in claim 11, a trip extending into the trough in the path of said blocks, a rocker shaft carrying said trough; a saw swingably mounted across the inlet end of the trough, and means actuated by the trip for swinging the saw to cut off the overhanging portion of the blocks in said trough, and for rocking the rocker shaft.

16. In a core block laying-up machine; a core board; a trough movably mounted adjacent the core board; means for feeding aligned core blocks having their upper faces coated with adhesive into the trough; means for automatically cutting off the overhanging portion of the row of blocks and moving the trough each time same is filled to deposit parallel rows of blocks upon the core board, the adhesive coated face of each row contacting with a face of the preceding row.

17. In a machine as set forth in claim 16, said trough moving means comprising a trip extending into the trough in the path of the blocks; a rocker shaft carrying said trough, and means actuated by the trip for rocking the rocker shaft.

18. In a machine as set forth in claim 16, a trip extending into the trough in the path of the blocks; and said automatic cutting off means comprising a frame swingably mounted across the inlet end of the trough; a saw carried by said frame; and means actuated by the trip for swinging the frame to cause the saw to cut off the overhanging portion of the row of blocks.

19. In a machine as set forth in claim 16, a trip extending into the trough in the path of said blocks, and said automatic cutting off and moving means comprising a rocker shaft carrying said trough; a frame swingably mounted across the inlet end of the trough, a saw carried by said frame; and means actuated by the trip for swinging the frame to cause the saw to cut off the overhanging portion of the row of blocks and for rocking the rocker shaft.

20. In a core block laying-up machine; a frame; a core board removably mounted on said frame; a tiltable core block trough mounted in the frame adjacent the core board; a trip adjacent the outer end of the trough in the path of the blocks; means for feeding aligned core blocks into the trough towards the trip; and means whereby each time the trip is actuated the trough will be automatically tilted to deposit parallel rows of blocks upon the core board, the rows contacting.

21. In combination with a machine as set forth in claim 20, means for cutting off the overhanging portions of the blocks in the trough before the trough is tilted.

22. In combination with a machine as set forth in claim 20, a frame swingably mounted across the inlet end of the trough; a saw carried by said frame; and means actuated by the trip for swinging the frame to cause the saw to cut off the overhanging portion of the blocks in said trough.

23. In combination with a machine as set forth in claim 20, a rocker shaft carrying said trough; a frame swingably mounted across the inlet end of the trough, a saw carried by said frame; and means actuated by the trip for swinging the frame to cause the saw to cut off the overhanging portion of the blocks in said trough and for rocking the rocker shaft.

24. In a core block laying-up machine; a frame; a core board removably mounted on said frame; a tiltable core block trough mounted in the frame adjacent the core board; a trip adjacent the outer end of the trough in the path of the blocks; means for feeding aligned core blocks having their upper faces coated with adhesive into the trough towards the trip and means whereby each time the trip is actuated the overhanging portions of the blocks in the trough will be automatically cut off and the trough will be automatically tilted to 90 degrees to deposit parallel rows of blocks upon the core board, the adhesive coated face of each row contacting with a face of the preceding row.

25. In a machine as set forth in claim 24, said automatic cut off means comprising a frame swingably mounted across the inlet end of the trough; a saw carried by said frame; and means actuated by the trip for swinging the frame to cause the saw to cut off the overhanging portion of the blocks in the trough.

26. In combination with a machine as set forth in claim 24, said cut off and tilting means comprising a rocker shaft carrying said trough; a frame swingably mounted across the inlet end of the trough, a saw carried by said frame; and means actuated by the trip for swinging the frame to cause the saw to cut off the overhanging portion of the blocks in the trough and for rocking the rocker shaft.

27. In a core block laying-up machine, a frame, a core board; a rocker shaft; a trough carried by said rocker shaft and adapted when rocked to overlie said board; a pivoted saw frame at the inlet end of said trough; a rotatable saw journalled therein; a power shaft rotating the saw; a cam shaft; a loose pulley on the cam shaft driven from the power shaft; a disk cam on said cam shaft having a flat portion normally engaging the saw frame; a crank on said cam shaft; a lever on said rocker shaft; a link connecting the lever and crank; means for automatically feeding aligned core blocks into the trough; a trip extending into the trough; and clutch means whereby when the trip is actuated the pulley will be automatically locked to the cam shaft for one revolution to rock the saw and trough.

28. In a machine as set forth in claim 27, the saw-frame normally engaging the flat portion of the disk cam; the connection between the crank and link being disposed below and at the opposite side of the cam shaft from said flat portion; and the connection between the link and rocker shaft lever being slotted, whereby as the cam shaft is revolved the saw will be first projected and then the rocker shaft rocked, the saw remaining projected until the end of the revolution, for the purpose specified.

29. In a machine as set forth in claim 27, said pulley having a clutch face on its hub; and said clutch means comprising a collar fixed on said cam shaft adjacent the pulley; a slidable bolt in said collar; spring means for normally urging the bolt into engagement with the pulley clutch face; an arm swingably mounted above the collar; a contact member on said arm; a plate on said sliding bolt normally engaging said arm to limit the sliding movement of the bolt; a link connecting the arm with said trip whereby as the trip is actuated the arm will be swung towards the pulley; and a striking member on said collar normally disposed intermediate the arm and pulley and adapted to strike the contact member on the arm at the end of the revolution of the cam shaft to restore the arm and bolt to normal position.

In testimony that I claim the foregoing as my own, I affix my signature.

HAROLD L. BRANDAU.